United States Patent
Elz

(10) Patent No.: US 8,583,804 B2
(45) Date of Patent: Nov. 12, 2013

(54) IDENTIFYING USER ROLE IN IP MULTIMEDIA SUBSYSTEM

(75) Inventor: Ian Gordon Elz, Coventry (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 142 days.

(21) Appl. No.: 12/995,510

(22) PCT Filed: Jun. 3, 2008

(86) PCT No.: PCT/EP2008/056857
§ 371 (c)(1),
(2), (4) Date: Apr. 5, 2011

(87) PCT Pub. No.: WO2009/146739
PCT Pub. Date: Dec. 10, 2009

(65) Prior Publication Data
US 2011/0179181 A1 Jul. 21, 2011

(51) Int. Cl.
*G06F 15/16* (2006.01)
*G06F 15/173* (2006.01)
*H04L 12/28* (2006.01)
*H04L 29/06* (2006.01)
*H04L 29/08* (2006.01)
*G06Q 10/10* (2012.01)
*H04L 12/56* (2011.01)

(52) U.S. Cl.
CPC .......... *H04L 29/06* (2013.01); *H04L 29/08576* (2013.01); *G06Q 10/107* (2013.01); *H04L 45/00* (2013.01)
USPC ........... 709/227; 709/206; 709/225; 370/389; 370/392

(58) Field of Classification Search
None
See application file for complete search history.

(56) References Cited

U.S. PATENT DOCUMENTS

| 2003/0069848 A1* | 4/2003 | Larson et al. ................... 705/50 |
| 2003/0158951 A1* | 8/2003 | Primak et al. ................ 709/229 |
| 2005/0050194 A1* | 3/2005 | Honeisen et al. ............. 709/224 |
| 2005/0202817 A1* | 9/2005 | Sudit ............................ 455/433 |
| 2006/0053208 A1* | 3/2006 | Laurila et al. ................ 709/206 |
| 2006/0077926 A1* | 4/2006 | Rune ............................ 370/328 |

(Continued)

FOREIGN PATENT DOCUMENTS

| GB | 2 432 748 A | 5/2007 |
| WO | 2007/060074 A1 | 5/2007 |
| WO | WO 2007060074 A1 * | 5/2007 |

OTHER PUBLICATIONS

Kuehne, "Charging in the IP Multimedia Subsystem: A Tutorial", IEEE Communications Magazine, Jul. 2007, pp. 92-99.*

(Continued)

*Primary Examiner* — Andrew L. Nalven
*Assistant Examiner* — Walter Malinowski
(74) *Attorney, Agent, or Firm* — Potomac Patent Group PLLC

(57) ABSTRACT

A Session Initiation Protocol Application Server for use within an IP Multimedia Subsystem. The Application Server comprises a receiving unit for receiving a Session Initiation Protocol message from a Serving Call Session Control Function, the Serving Call Session Control Function serving an IP Multimedia Subsystem user and the message containing within a message header an explicit identification of said user. A processing unit determines an action to be applied to said message and includes within a header of the message a role value defining a role of said user in respect of the action. A transmitter unit returns the message including the role value to said Serving Call Session Control Function.

3 Claims, 7 Drawing Sheets

(56) References Cited

U.S. PATENT DOCUMENTS

| | | | |
|---|---|---|---|
| 2006/0167760 A1* | 7/2006 | Chakraborty et al. | 705/26 |
| 2006/0173936 A1* | 8/2006 | Castro et al. | 707/205 |
| 2006/0200504 A1* | 9/2006 | Lo | 707/204 |
| 2007/0220591 A1* | 9/2007 | Damodaran et al. | 726/4 |
| 2009/0041010 A1* | 2/2009 | Bakker et al. | 370/352 |
| 2009/0164556 A1* | 6/2009 | Siegel et al. | 709/203 |

OTHER PUBLICATIONS

Zhang, "SIP-case VoIP network and its interworking with the PSTN", Electronics & Communication Engineering Journal, Dec. 2002, pp. 273-282.*

PCT International Search Report, dated Dec. 2, 2009, in connection with International Application No. PCT/EP2008/056857.

PCT Written Opinion, dated Dec. 2, 2009, in connection with International Application No. PCT/EP2008/056857.

International Preliminary Report on Patentability, dated Oct. 15, 2010, in connection with International Application No. PCT/EP2008/056857.

Digital cellular telecommunications system (Phase 2+); Universal Mobile Telecommunications System (UMTS); TISPAN; IP Multimedia Call Control Protocol based on Session Initiation Protocol (SIP) and Session Description Protocol (SDP) Stage 3 (3GPP TS 24.229 (Release 7), modified] ETSI Standards, LIS, Sophia Antipolis Cedex, France, vol. 3—CTI, No. V7.0.0, Apr. 1, 2008, XP014041664, ISSN: 0000-0001.

Third Generation Partnership Project TS 24.607, V1.6.0, Technical Specification Group Core Network and Terminals; Originating Identification Presentation (OIP) and Originating Identification Restriction (OIR) using IP Multimedia (IM) Core Network (CC) subsystem; Protocol specification (Release 8), May 2008.

Rosenberg, J. et al. "SIP: Session Initiation Protocol" Network Working Group, RFC 3261. The Internet Society, 2002.

Peterson, J. "A Privacy Mechanism for the Session Initiation Protocol (SIP)" Network Working Group, RFC 3323. The Internet Society, 2002.

Barnes, M., Ed. "An Extension to the Session Initiation Protocol (SIP) for Request History Information" Network Working Group, RFC 4244. The Internet Society, 2005.

van Elburg, J. The Session Initiation Protocol (SIP) P-Served-User Private-Header (P-Header), IETF, Sipping Working Group, Apr. 21, 2008.

* cited by examiner

```
P-Served-User        = "P-Served-User" HCOLON PServedUser-value
                              *(SEMI served-user-param)
served-user-param    = sessioncase-param
                        / registration-state-param
                        / userrole-param / generic-param
PServedUser-value    = name-addr / addr-spec
sessioncase-param    = "sescase" EQUAL "orig" / "term"
registration-state-param = "regstate" EQUAL "unreg" / "reg"
userrole-param       = "userrole" EQUAL "orig" / "term" / "div"
                        / "trans" /...
```

Figure 6

IDENTIFYING USER ROLE IN IP MULTIMEDIA SUBSYSTEM

TECHNICAL FIELD

The present invention relates to Session Initiation Protocol message handling in an IP Multimedia Subsystem (IMS), and in particular to a method and apparatus for allowing a SIP Application Server to identify the role of a SIP user associated with a SIP message.

BACKGROUND

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services which are considered in more detail below.

IP Multimedia Subsystem (IMS) is the technology defined by the Third Generation Partnership Project (3GPP) to provide IP Multimedia services over mobile communication networks. The main IMS specification is TS24.229. IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

FIG. 1 illustrates schematically how the IMS fits into the mobile network architecture in the case of a GPRS/PS access network. Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the address at which a SIP user identity can be reached. The user receives a unique URI from the S-CSCF that it shall use when it initiates a dialog. In 3GPP, when a SIP terminal performs a registration, the IMS authenticates the user, and allocates an S-CSCF to that user from the set of available S-CSCFs. Whilst the criteria for allocating S-CSCFs is not specified by 3GPP, these may include load sharing and service requirements. It is noted that the allocation of an S-CSCF is key to controlling (and charging for) user access to IMS-based services. Operators may provide a mechanism for preventing direct user-to-user SIP sessions which would otherwise bypass the S-CSCF.

During the registration process, it is the responsibility of the I-CSCF to select an S-CSCF if one is not already selected. The I-CSCF receives the required S-CSCF capabilities from the home network's Home Subscriber Server (HSS), and selects an appropriate S-CSCF based on the received capabilities. [It is noted that S-CSCF allocation is also carried out for a user by the I-CSCF in the case where the user is called by another party, and the user is not currently allocated an S-CSCF.] When a registered user subsequently sends a session request (e.g. SIP INVITE) to the IMS, the request will include the P-CSCF and S-CSCF URIs so that the P-CSCF is able to forward the request to the selected S-CSCF. This applies both on the originating and terminating sides (of the IMS). [For the terminating call the request will include the P-CSCF address and the UE address.]

Within the IMS service network, Application Servers (ASs) are provided for implementing IMS service functionality. Application Servers provide services to end-users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment. Different IFCs may be applied to different call cases. The IFCs are received by the S-CSCF from an HSS during the IMS registration procedure as part of a user's User Profile. Certain Application Servers will perform actions dependent upon subscriber identities (either the called or calling subscriber, whichever is "owned" by the network controlling the Application Server). For example, in the case of call forwarding, the appropriate (terminating) application server will determine the new terminating party to which a call to a given subscriber will be forwarded.

The working group known as ETSI TISPAN initially developed the use of IMS for fixed broadband accesses, although this task has now been passed to 3GPP. One of their tasks is to develop supplementary services based upon the IMS defined by 3GPP. These supplementary services will be defined in separate specifications although they will impact upon core specifications such as TS24.229. FIG. 2 illustrates schematically the message flow within the IMS for a SIP INVITE, on the call originating side, according to TS24.229 (chapter 5.4.3.2). At step 1), the INVITE is sent from the originating User Equipment (UE) to the P-CSCF. This INVITE includes in its header a so-called P-Preferred identity, as well as including the URI of the P-CSCF at the topmost level of the SIP route header and the URI of the S-CSCF as the second entry. The UE also includes the identity of the communicating partner in the Request-URI. Upon receipt of the INVITE, the P-CSCF checks that the originating UE is allowed to use the identity included as the P-Preferred identity, and if so includes it as the P-Asserted Identity in the outgoing INVITE. The P-Asserted Identity is an identity that is used among trusted SIP entities, typically intermediaries, to carry the identity of the user sending a SIP message as it was verified by authentication. The P-CSCF identifies the S-CSCF allocated to the originating UE by looking in the Route Header, and at step 2) forwards the amended INVITE to that S-CSCF.

The S-CSCF handles the call according to an originating call case procedure. The S-CSCF uses the P-Asserted Identity to check whether any relevant restrictions have been placed on the originating UE, e.g. is the UE barred from using the requested service. The S-CSCF also uses the P-Asserted Identity and call case to determine the IFCs for the UE. In the example of FIG. 2, it is assumed that the IFCs require that the S-CSCF forward (step 3)) the INVITE to a particular AS. The S-CSCF includes at the topmost level of the SIP route header the URI of the AS. It also includes in the subsequent level its own URI, together with an Original Dialog Identifier (ODI).

The ODI is generated by the S-CSCF and uniquely identifies the call to the S-CSCF. The AS will itself perform authentication, for example based upon the P-Asserted Identity contained in the message (the originating case). The appropriate case is identified to the AS by the S-CSCF (e.g. by sending the message to an appropriate port of the AS). When the AS returns the INVITE (step 4)) to the S-CSCF, the AS strips the URI of the AS from the route header, leaving the URI of the S-CSCF together with the ODI tag. The ODI tag allows the S-CSCF to determine that the INVITE relates to an earlier dialogue.

It is possible for the AS logic to require the setting up of a new session, in which case it would be necessary to provide a mechanism which allows the AS to replace the original R-URI with the URI of the new terminating User (the existing TSs do not as yet provide for this re-routing scenario). In this case, the identity of the origin, i.e. the P-Asserted Identity of the INVITE at step 4), can be either the identity of the originating UE, the identity of the AS, or an identity of a third party on whose behalf the AS is setting up the new session. In this case, the S-CSCF will repeat the call restriction check and determine the IFCs based upon the P-Asserted Identity contained in the "new" INVITE, assuming that the originating case is used. However, it is possible that the AS may signal to the S-CSCF that the terminating case is to be used, in which case the checks are carried out using the R-URI of the INVITE. Assuming that no further ASs are to be linked-in based upon the IFCs, the S-CSCF forwards the INVITE to the Request URI (R-URI) contained in the INVITE. This may be the R-URI contained in the original INVITE, or a new R-URI contained in the new INVITE if that is different.

FIG. 3 illustrates schematically the message flow within the IMS for a SIP INVITE on the call terminating side (TS24.229: chapter 5.4.3.3). At step 1), the INVITE arrives from the I-CSCF (not shown) including the R-URI indicating the called party. The S-CSCF uses this R-URI to check for restrictions placed on the called party, and to obtain the IFCs. In this case, the IFCs do not indicate that an AS needs to be contacted. The S-CSCF will acquire the preloaded Route Headers for the called party, based on the R-URI, and send the INVITE forward to be UE based on these Route Header entries. The INVITE is received by the P-CSCF in accordance with the preloaded route in the S-CSCF, and the P-CSCF sends the INVITE to the UE in accordance with the contact header.

FIG. 4 illustrates an alternative INVITE message flow scenario, where a call from an originating terminal (UE-O) to a peer terminal (UE-F) is forwarded to a terminating terminal (UE-T). The call forwarding action is performed by an Application Server (AS-F). The call flow is as follows:

1) The INVITE is sent from UE-O addressed to UE-F (R-URI). The S-CSCF O performs the originating side call procedure as described with reference to FIG. 2.
2) After interaction with the AS-O (no change is made to the R-URI at this stage) the S-CSCF O sends the INVITE to the I-CSCF (not shown) of UE-F's home network. The I-CSCF will acquire the address of the S-CSCF where the UE-F is registered from the HSS. The INVITE is sent to that S-CSCF, i.e. to S-CSCF F. The S-CSCF F will check the restriction requirement and obtain the IFCs as described above (for the terminating side case) with reference to FIG. 3, i.e. based on the R-URI contained in the INVITE. In the scenario illustrated in FIG. 4, the INVITE will be sent to the AS-F where the call forwarding is activated.
3) The AS-F will then change the R-URI in the INVITE header from that of UE-F to that of UE-T. The modified INVITE will be returned to the S-CSCF F.
4) The S-CSCF F will send the INVITE to the I-CSCF of the UE-T network, and the I-CSCF (not shown) will interrogate the HSS to get the address of the S-CSCF T of UE-T, and forward the INVITE to the S-CSCF T.
5) The S-CSCF T will perform the terminating procedure as described with reference to FIG. 3, on the basis of the R-URI contained in the INVITE (that is the R-URI of UE-T)

As mentioned above, an Application Server may be required to perform an authorisation on one of the parties associated with the call, before returning a SIP message to the S-CSCF. Whilst this may be straightforward in the case of the originating and terminating cases of FIGS. 2 and 3, the situation is more complex in the call forwarding case of FIG. 4 as the Application Server does not implicitly know which case to apply for which user. WO2007060074 describes a solution to this problem, proposing that, upon receipt of a SIP message at an S-CSCF and following a decision to forward the message to an AS, the S-CSCF introduce a new header into the message referred to as a "P-Served-User". The proposal is also detailed in the IETF draft: http://tools.ietf.org/wg/sipping/draft-vanelburg-sipping-served-user-05.txt. The role of the new header is to explicitly identify the user that is being served by the S-CSCF and the session case associated with the call for the served user. Whilst in the simple call originating case (FIG. 2) and call terminating case (FIG. 3) the new header will contain the SIP URI of the originating and terminating users respectively, in the case of the call forwarding scenario (FIG. 4), considering S-CSCF F, the header will contain the URL of the forwarding terminal, i.e. UE F. The header will also likely indicate either the originating or terminating call case, and whether or not UE-F is registered with the S-CSCF. An example header might be:

P-Served-User: <sip:bob@home2.net>;sesscase=orig; regstate=reg

Use of the P-Served-User allows the Application Server to apply a more appropriate authorisation procedure to the message.

Considering further the call forwarding scenario, FIG. 5 illustrates the case where a SIP INVITE originating at a user A (not shown in the Figure) is received for user B at an S-CSCF, message 1. The Filter Criteria are evaluated by the S-CSCF and AS-1 is invoked by the sending of message 2. The S-CSCF includes the P-Served-User header to ensure that the correct served user is identified to the Application Server. AS-1 determines that the INVITE should be diverted to a user C. The Request URI is modified to include C as the target of the request (R-URI), message 3. Changing the Request URI in this way causes the S-CSCF to break the Filter Criteria chain with the result that any additional terminating services for user B are not performed upon receipt of message 3 at the S-CSCF. The S-CSCF is instructed to carry out originating services for user B by including the 'orig' parameter in the PSU header in message 3. Alternatively, this could be indicated in the top route header. Evaluation of the originating filter criteria for user B at the S-CSCF invokes AS-2, message 4, which performs the Originating Identity Restriction (OIR) service on behalf of user B (OIR and the related OIP service are considered in 3GPP TS24.607).

A result of the OIR service is the inclusion within the message header of user B's privacy settings, namely the "header" and "id" parameters to indicate to downstream nodes performing the OIP service that user identities within the P-Asserted Identity and other header fields should be hidden. These settings are included in the INVITE sent to the S-CSCF, message 5. The S-CSCF forwards the INVITE to C, message 6, maintaining the privacy settings of user B. This will result in a downstream OIP service deleting user A's identity from the message header, despite the fact that user A is happy to reveal its identity to the end receiver, as exhibited by the presence of the parameter "none" in the privacy header of the original request.

SUMMARY

It is an object of the present invention to provide a means whereby an IMS Application Server can determine the role of a user that is being served by an S-CSCF from which a SIP message has been forwarded. This object is achieved by allowing ASs to include role values into messages in dependence upon actions determined by the ASs.

According to a first aspect of the present invention there is provided a Session Initiation Protocol Application Server for use within an IP Multimedia Subsystem. The Application Server comprises a receiving unit for receiving a Session Initiation Protocol message from a Serving Call Session Control Function, the Serving Call Session Control Function serving an IP Multimedia Subsystem user and the message containing within a message header an explicit identification of said user. A processing unit determines an action to be applied to said message and includes within a header of the message a role value defining a role of said user in respect of the action. A transmitter unit returns the message including the role value to said Serving Call Session Control Function.

The processing unit may be configured to include said role value within a header field that contains said explicit identification of said user, e.g. within a P-Served-User header.

Considering further actions that may be determined by said processing unit, these may include transferring and diverting a call to which said message relates. In this case, the role value defines that the served user is the transferor or divertor of the call. Additionally, a further role value may be included within a header defining that the served user is to be treated as the originator or terminator of the call for the purpose of call case handling by the Serving Call Session Control Function.

In the case that the S-CSCF has already included a role value into the message header, e.g. indicating that it is presently applying an originating or terminating call case to the message, the processing unit may be arranged to include the new role value in the message header by replacing the pre-existing role value.

According to a second aspect of the present invention there is provided a Session Initiation Protocol Application Server for use within an IP Multimedia Subsystem. The Application Server comprises a receiving unit for receiving a Session Initiation Protocol message from a Serving Call Session Control Function, the Serving Call Session Control Function serving an IP Multimedia Subsystem user and the message containing within a message header an explicit identification of said user and one or more role values specifying the role of the served user in respect of the message. A processing unit is provided for determining an action to be applied to said message and for applying the action to the message in dependence upon the specified role(s). A transmitter unit then returns the message to said Serving Call Session Control Function.

According to an embodiment of the above second aspect of the invention, the Application Server may be configured to implement a privacy service, e.g. the Originating Identity Privacy service. In this case, said action is one of applying privacy settings to the message. For example, the processing unit may be being arranged to determine from a role value contained within the message whether or not the served user is responsible for a call diversion and, if so, to apply privacy to only a history header of the message. Alternatively, said processing unit may be arranged to determine from a role value contained within the message whether or not the served user is responsible for a call transfer and, if so, to apply privacy to only a Referred-By header of the message.

According to a third aspect of the present invention there is provided a method of handling a Session Initiation Protocol message within an IP Multimedia Subsystem. The method comprises receiving the message at a Serving Call Session Control Function, where the message includes a message header containing an identity of the user served by the Serving Call Session Control Function and to which the message relates. The message is forwarded to a first Application Server. Upon receipt of the message, the first Application Server determines an action to be applied to the message, e.g. call forwarding or call diversion, and includes in a message header a role value defining the role of the served user in respect of the action. The message is then returned to the Serving Call Session Control Function which in turn forwards it to a second Application Server. Upon receipt of the message at the second Application Server, this server determines an action to be applied to the message, e.g. a privacy setting, and applies that action in dependence upon the role value it contains.

BRIEF DESCRIPTION OF THE DRAWINGS

FIG. 6 shows an example SIP message header structure for conveying a served user role value;

DETAILED DESCRIPTION

As has already been considered, Session Initiation Protocol (SIP) messages including but not limited to SIP INVITES may not be handled correctly or appropriately by a SIP Application Server (AS) where the AS is unaware of the role being performed by a user that is being served by a Serving Call Session Control Function (S-CSCF) and that is associated with the message. That is to say that, whilst advantages are achieved by including a P-Served-User header (or alternative field for identifying the served user) in a SIP message forwarded from the S-CSCF to the AS, this in itself is not sufficient in certain cases.

An example that has been considered above is the inappropriate application of privacy settings in the case of a SIP INVITE forwarded to an AS which decides to implement call forwarding on behalf of the user served by the S-CSCF. By way of further background, privacy headers are defined in RFC3323 and further extended by RFC4244 (History-Info). Privacy headers allow the user to specify which of his identities can be revealed to other parties in the communication session. Privacy headers provide multiple values which relate to different identities included in the SIP messaging. For example, a privacy value of 'id' will prevent the user's authorised identity from being disclosed in the P-Asserted Identity header. A value of 'headers' will prevent the user's identity being included in any headers sent to a peer user. When the History-Info RFC (RFC4244) was written, the privacy header was extended to allow for the privacy of user identities included in History-Info headers. More specifically, this privacy feature is referenced by using the 'history' tag in the Privacy header or by including a parameter of 'Privacy=history' with a specific URI included in the History-Info header.

Figure 1:
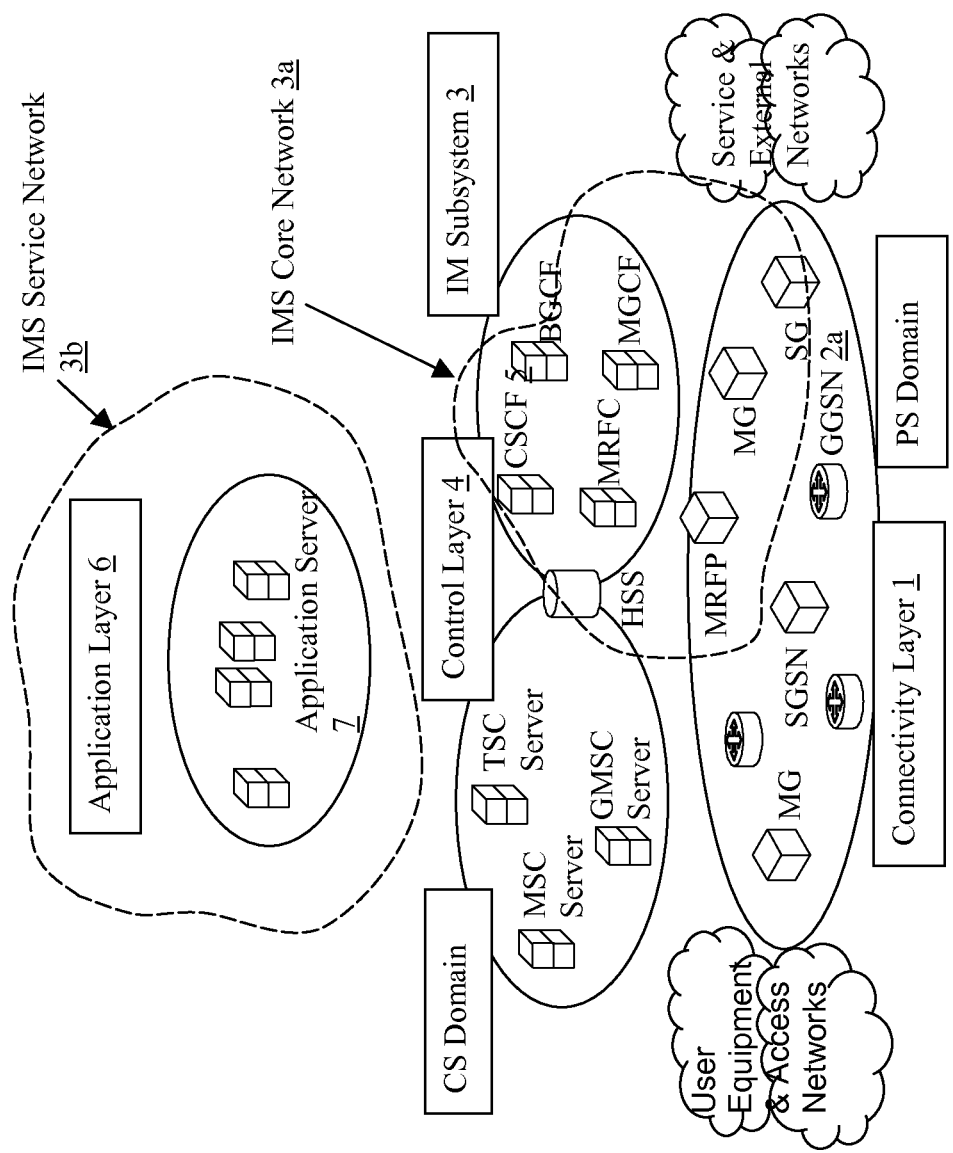
FIG. 1 illustrates schematically the integration of an IP Multimedia Subsystem into a 3G mobile communications system.
Figure 2:
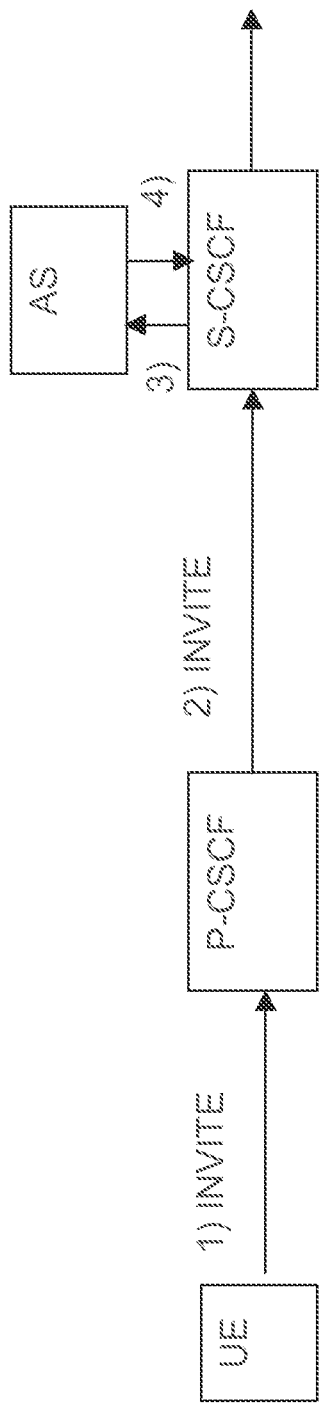
FIG. 2 illustrates the flow of a SIP INVITE on the originating call side of the IMS.
Figure 3:
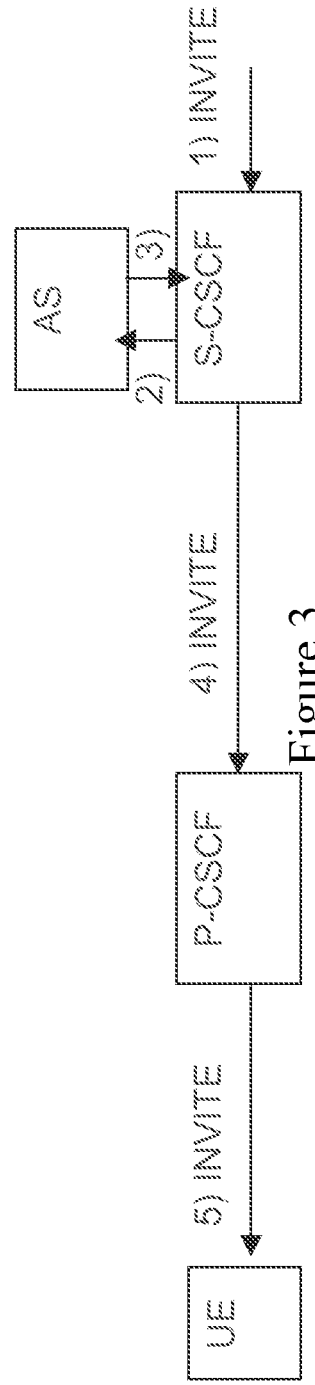
FIG. 3 illustrates the flow of a SIP INVITE on the terminating call side of the IMS.
Figure 4:
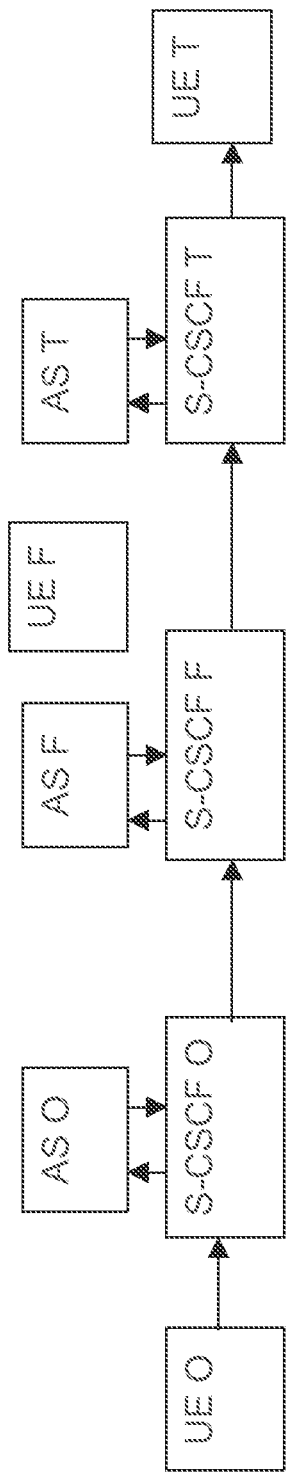
FIG. 4 illustrates the flow of a SIP INVITE in a call forwarding scenario within the IMS.
Figure 5:
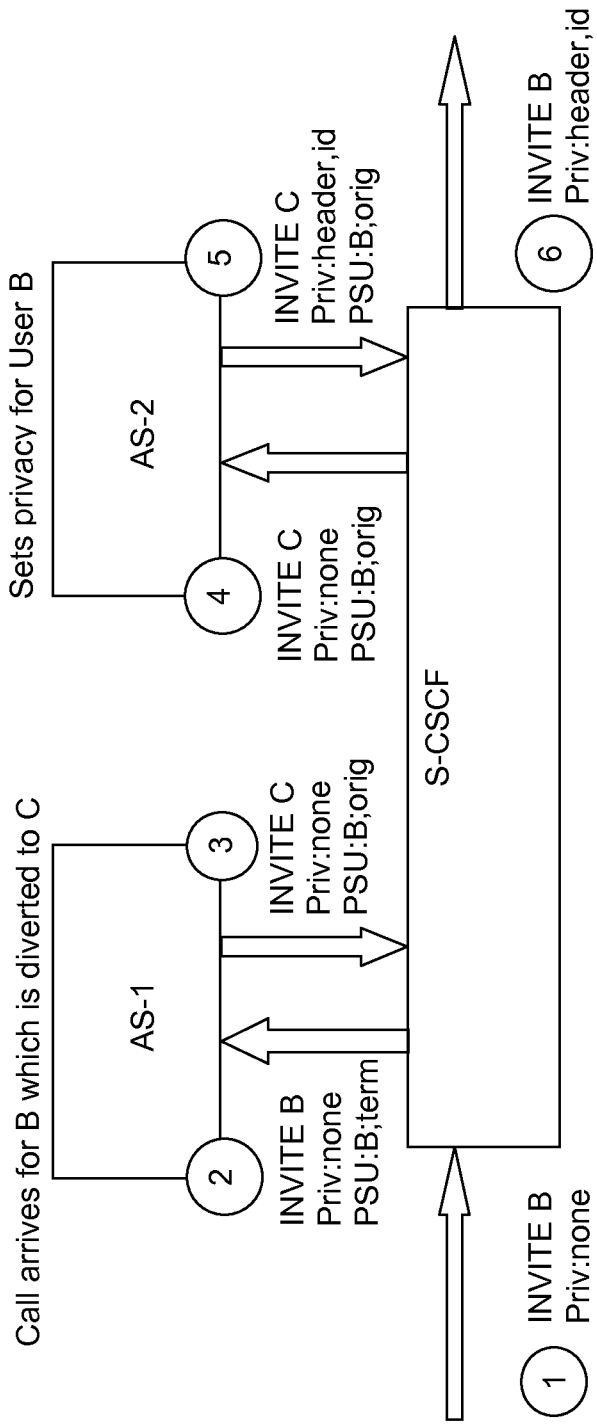
FIG. 5 illustrates privacy handling of a SIP INVITE during a call forwarding scenario according to the prior art.

With reference to FIG. 5, in order to apply privacy settings appropriately, AS-2, which performs the Originating Identity Restriction (OIR) based upon user B's identity, should be aware that user B is a diverting user, and not an originating user. This information allows AS-2 to determine, for example, that the privacy settings should be applied only to user B's identity, and not to user A's identity, for example to cause a downstream OIP service to delete user B's identity from a History-Info header included by AS-1, whilst retaining user A's identity.

It is proposed here to include a new header or an additional parameter within an existing or other header, e.g. the proposed P-Served-User header, containing a served user "role" so that the AS, for example an MMTel AS, can ensure that the correct functionality is applied when service interaction occurs. An example of a new SIP message header might be:

P-Served-User-Role="P-Served-User-Role" HCOLON Serveduserrole
Serveduserrole="userrole" EQUAL "orig"/"term"/"div"/ "trans"/ . . .

The precise nature of a new parameter to be added to an existing or other header will depend upon the header. It could however be in the form of a generic parameter or a URI parameter. In the case that the parameter is to be included in the proposed P-Served-User header [as defined in the IEFT draft, http://tools.ietforg/wg/sipping/draft-vanelburg-sip-ping-served-user-05.txt], the header structure set out in FIG. 6 is possible, where EQUAL, HCOLON, SEMI, name-addr, addr-spec and generic-param are defined in RFC3261. The following is an example of a P-Served-User header field with the proposed new parameter:

P-Served-User: <sip:captain@buzz.com>; sescase=orig; regstate=reg; userrole=div

The actual "values" allowed for the user role can take any appropriate form. However, a number of likely roles are; originating user (orig), terminating user (term), diversion (div) and transferring (trans) as these are known roles which are useful to the AS, i.e. these values allow the services (AS) to identify if the served user is the originating or terminating party to the call or if they are a diverting or transferring user. The logic deployed by the services will then depend upon the user role in the session. Of course, the range of allowed values should remain extensible so that new roles can be defined when specific cases are identified.

Figure 7:
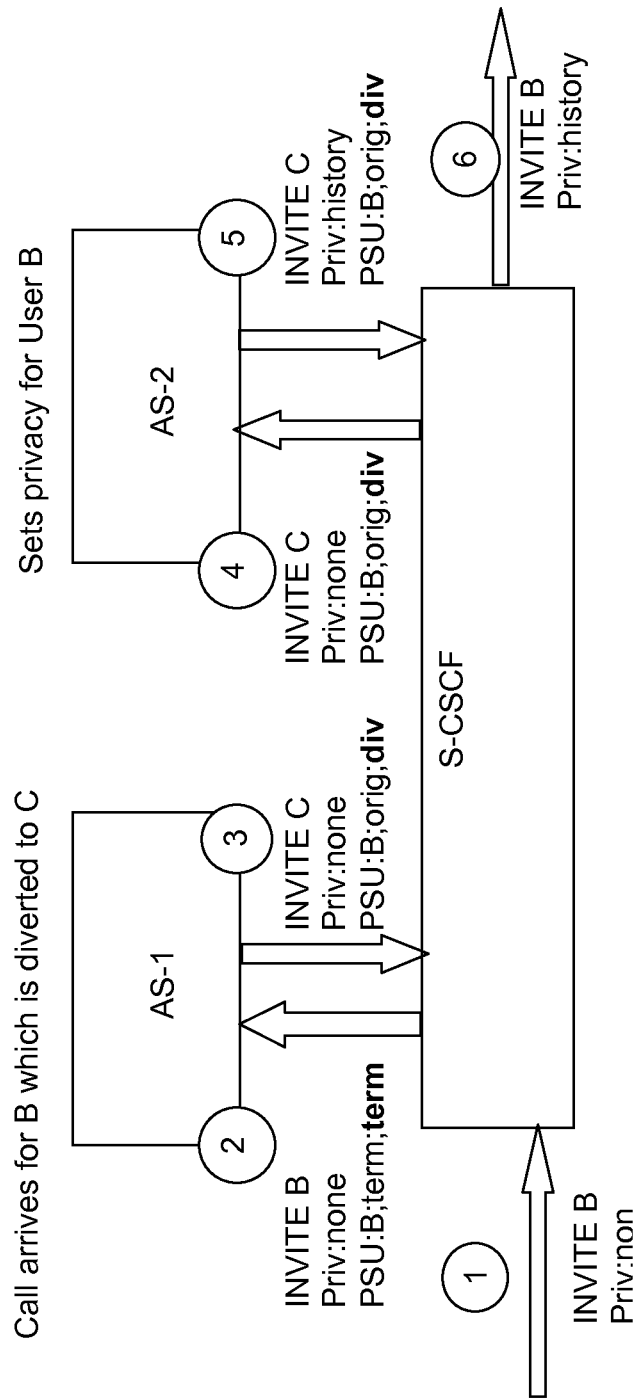
FIG. 7 illustrates privacy handling of a SIP INVITE during a call forwarding scenario and making use of a served user role value included with the SIP message.

FIG. 7 shows the updated sequence (vis-à-vis FIG. 5) where the user role parameter has been included in the P-Served-User header. The presence of the user role parameter (for user B) with value 'div' allows AS-2 to determine the correct actions to take. It will be noted in particular that AS-2 no longer chooses to include the fields "header" and "id" in the privacy header as these would cause user A's identity to be hidden. Rather, the OIR service adds the 'history' tag to the Privacy header, causing a downstream OIP service to hide only the history header which includes user B's identity. User B's identity is not contained in any other header fields and so remains anonymous to user C.

The role value may also be useful where a session has been transferred (nb. transfer of an ongoing call as opposed to diversion of a call during call establishment) and the transferor is identified in the "Referred-By" header introduced by the AS causing the transfer. The session case for the transferor (e.g. user B) in the session may be either originating or terminating, but the rules applying to a user role of originating or terminating user are not appropriate as this may cause a downstream modification of the privacy of the headers for either the true originating or terminating user. Thus, transferring AS introduces a role value "trans" into the P-Served User header. An OIR service at a subsequent AS identifies the presence of the trans role value and applies appropriate privacy settings for user B. This might involve adding a new parameter to the privacy header to specify that a downstream OIP service should delete the Referred-By header.

Another service that may use the role value is a charging service, where details of the role of the user in the session may be important to ensure that the correct identities are presented in the charging records produced.

Figure 8:
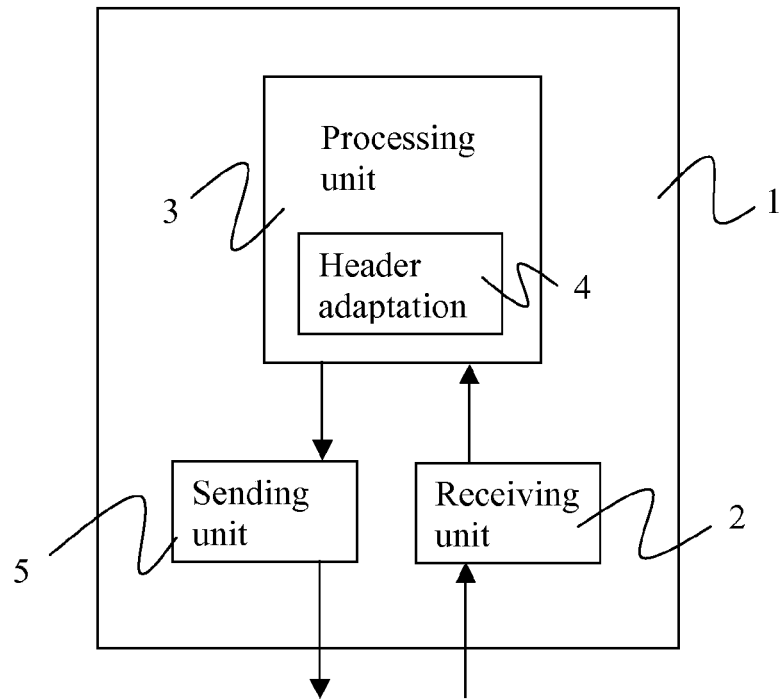
FIG. 8 illustrates schematically an Application Server configured to include a role value into a SIP message header in dependence upon an action performed by the Application Server.

FIG. 8 illustrates schematically an Application Server 1 configured to introduce action dependent role values into SIP messages received from an S-CSCF. The AS comprises a receiving unit or means 2 for receiving SIP messages sent across the ISC interface. The messages are passed to a processing unit or means 3 which comprises a header adaptation unit or means 4. The processing unit is arranged to determine an action to be applied to the message, whilst the adaptation unit is configured to introduce into the message header an appropriate role value (or values). The modified message is passed to a sending unit 5 which returns the message to the S-CSCF.

Figure 9:
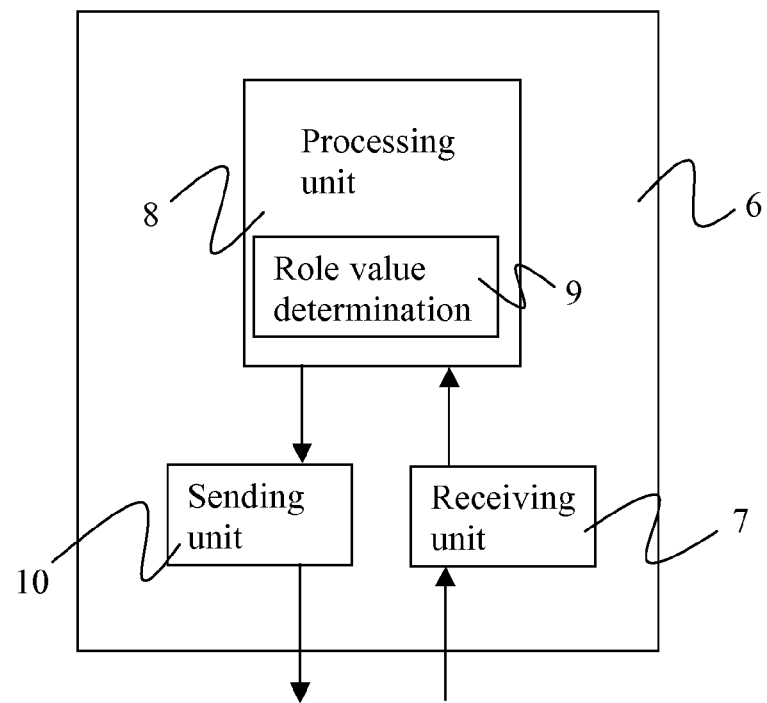
FIG. 9 illustrates schematically an Application Server configured to determine a role performed by a user associated with a SIP message, based upon a role value contained within the message.

FIG. 9 illustrates schematically an Application Server 6 configured to implement a role dependent service on behalf of users. For example, the AS may implement the OIR service. A receiving unit or means 7 receives SIP messages from an S-CSCF over the ISC interface. These messages are passed to a processing unit or means 8. The processing unit is configured to apply an action to the message. A role determination unit or means 9 determines the role of the user served by the S-CSCF from a role value contained within the message header. The action applied is modified according to the user's role. The message is then passed to a sending unit 10 and returned to the S-CSCF. It is noted here that, if the S-CSCF determines that the SIP message should now be forwarded towards the called party, and not directly to another AS, the S-CSCF will strip out the P-Served User filed including the role value(s).

The mechanism proposed here enables a service deployed on a given application server to determine the correct functionality to apply to a session based upon actions taken by a previous application server in the routing path. By making use of multiple user role headers or parameters it would be possible to use a combination of different user roles applied by different application servers to resolve complex service interaction issues.

It will be appreciated by the person of skill in the art that various modifications may be made to the embodiments described above without departing from the scope of the present invention.

The invention claimed is:

1. A Session Initiation Protocol Application Server for use within an IP Multimedia Subsystem, the Application Server comprising:
a receiver configured to receive a Session Initiation Protocol message from a Serving Call Session Control Function, the Serving Call Session Control Function serving an IP Multimedia Subsystem user and the message containing within a message header an explicit identification of said user and one or more role values specifying the role of the served user in respect of the message;
a processor configured to determine an action to be applied to said message and to apply the action to the message in dependence upon the specified role(s); and
a transmitter configured to return the message to said Serving Call Session Control Function,
wherein an action that can be applied by said processor is a privacy setting, and
said processor is configured to determine from a role value contained within the message whether or not the served user is responsible for a call diversion and, if so, to apply privacy to only a history header of the message.

2. A method of handling a Session Initiation Protocol message within an IP Multimedia Subsystem, the method comprising:
receiving the message at a Serving Call Session Control Function;
including in a message header an identity of the user served by the Serving Call Session Control Function and to which the message relates;
forwarding the message to a first Application Server;
receiving the message at said first Application Server, determining an action to be applied to the message, and including in a message header a role value defining the role of the served user in respect of the action;
forwarding the message back to the Serving Call Session Control Function;
forwarding the message to a second Application Server; and
receiving the message at the second Application Server, determining an action to be applied to the message, and applying that action in dependence upon the role value it contains,
wherein the action to be applied by the second Application Server to the message is a privacy setting, and
the method further comprises the second Application Server determining from the role value contained within the message whether or not the served user is responsible for a call diversion and, if so, applying privacy to only a history header of the message.

3. A method according to claim 2 further comprising, upon receipt of the message at the Serving Call Session Control Function, including a role value for the served user into the message header.

* * * * *